Nov. 22, 1955    J. J. LARMOUR    2,724,200
MACHINE FOR MAKING INLAID ARTICLES
Filed Feb. 2, 1950    4 Sheets-Sheet 1
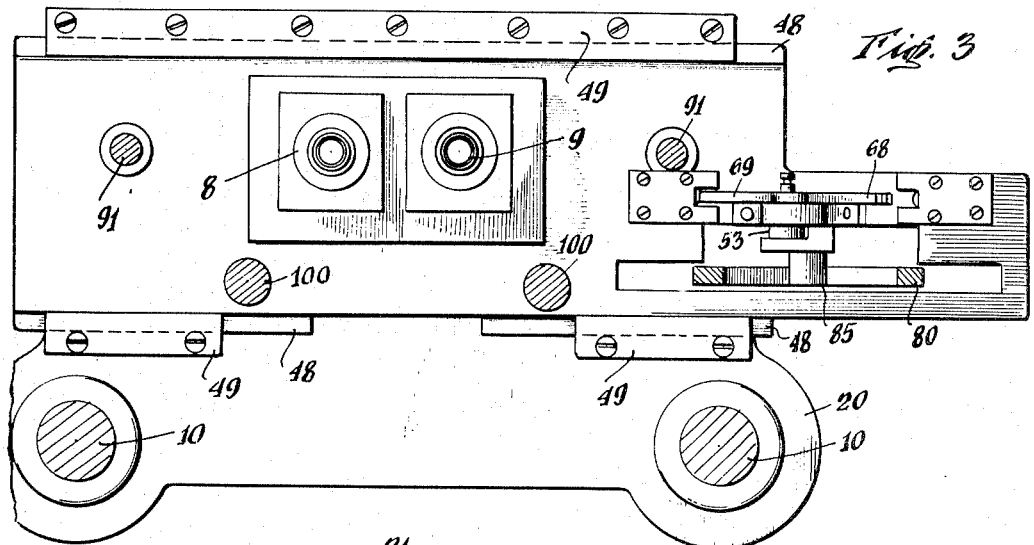
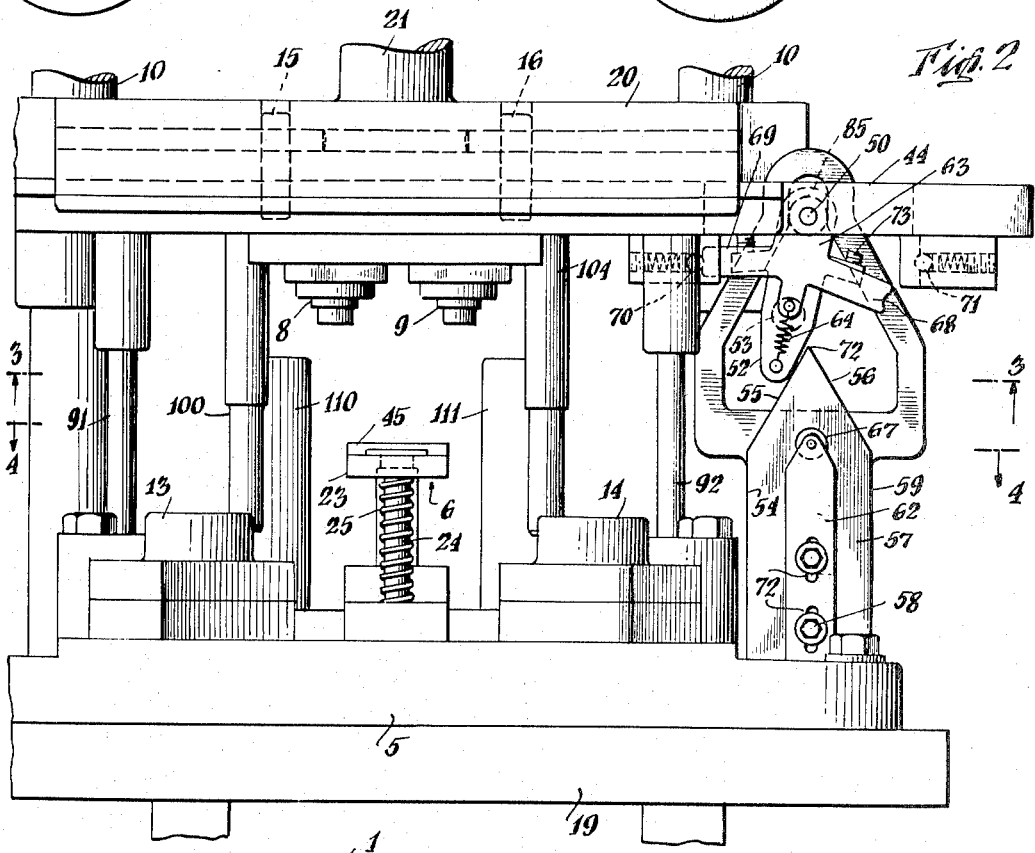
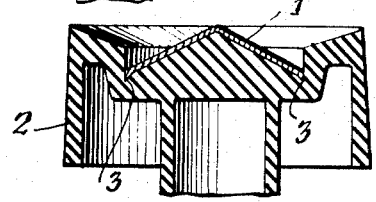
INVENTOR.
James J. Larmour
BY
Norman R. Holland
ATTORNEY

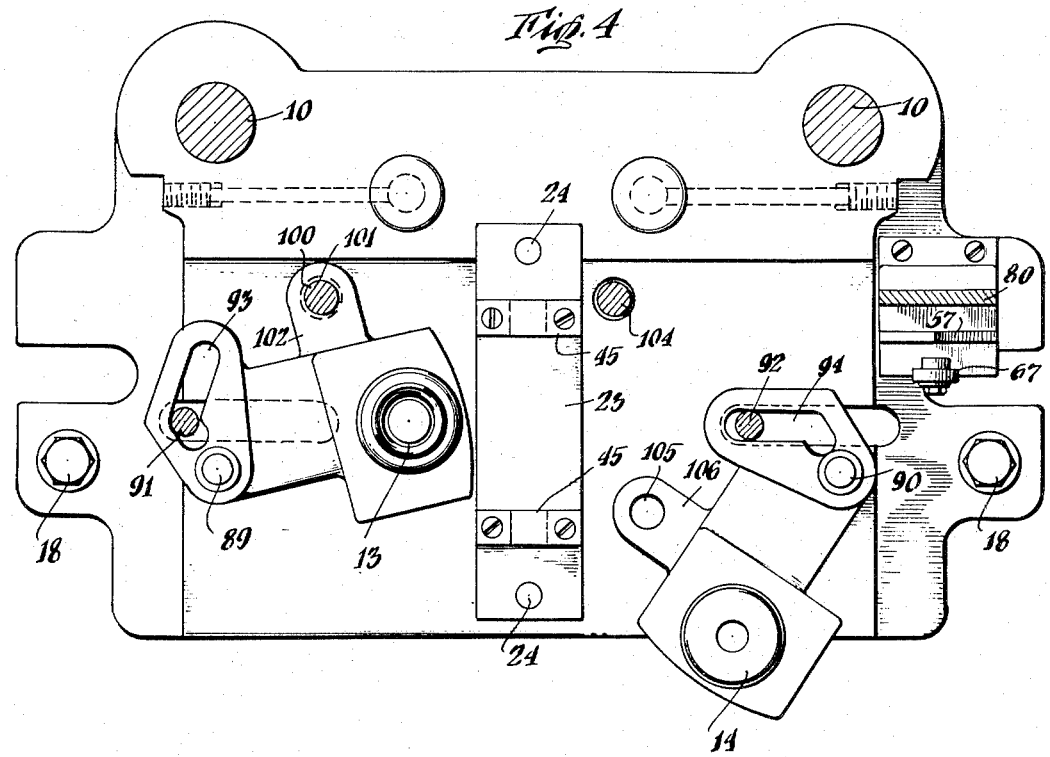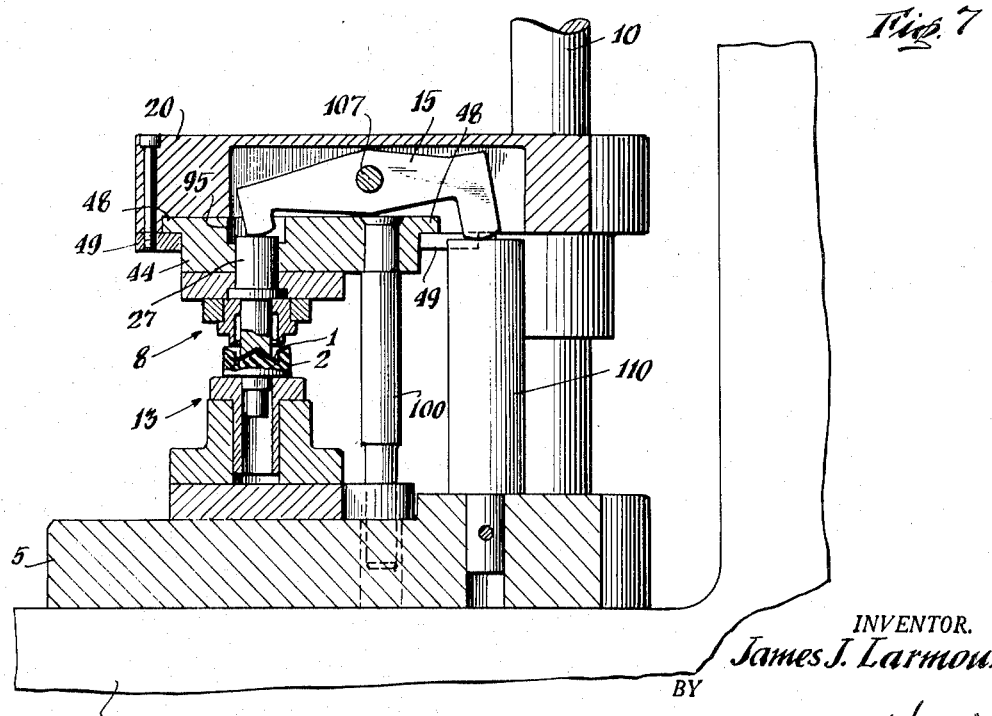

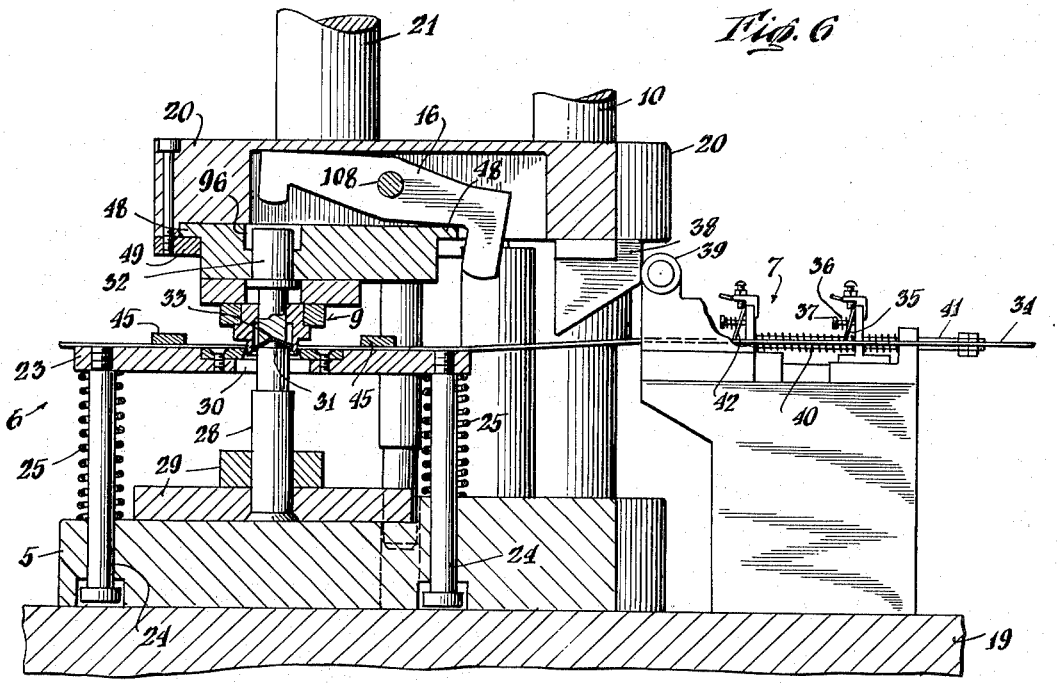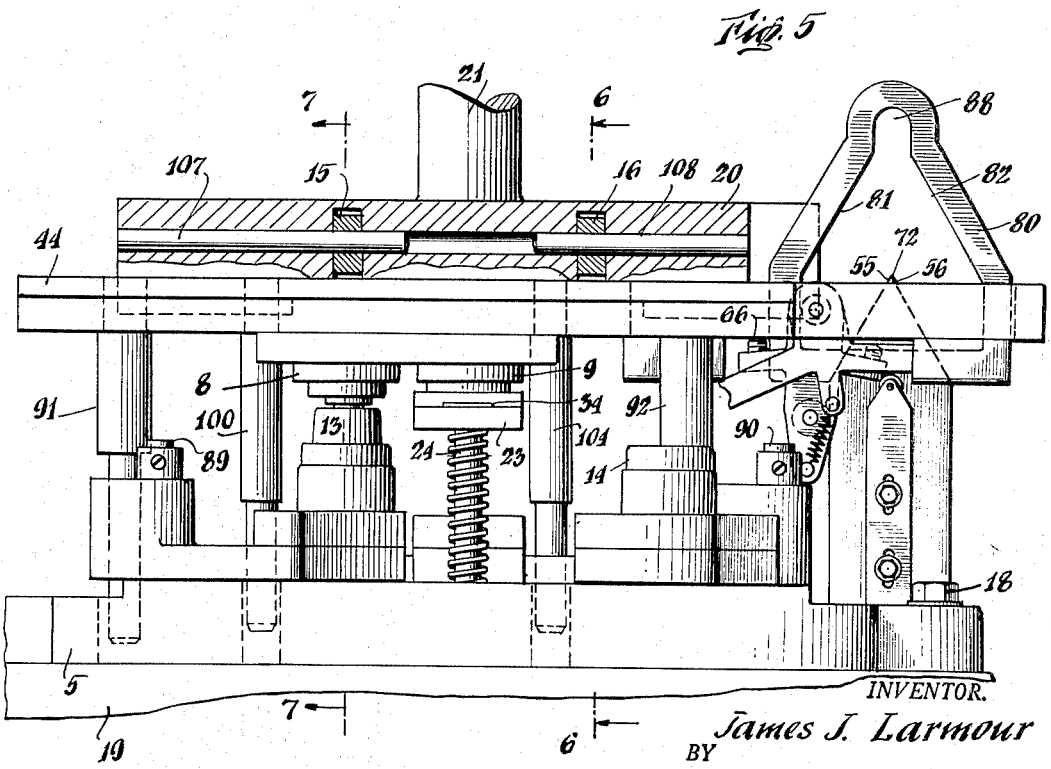

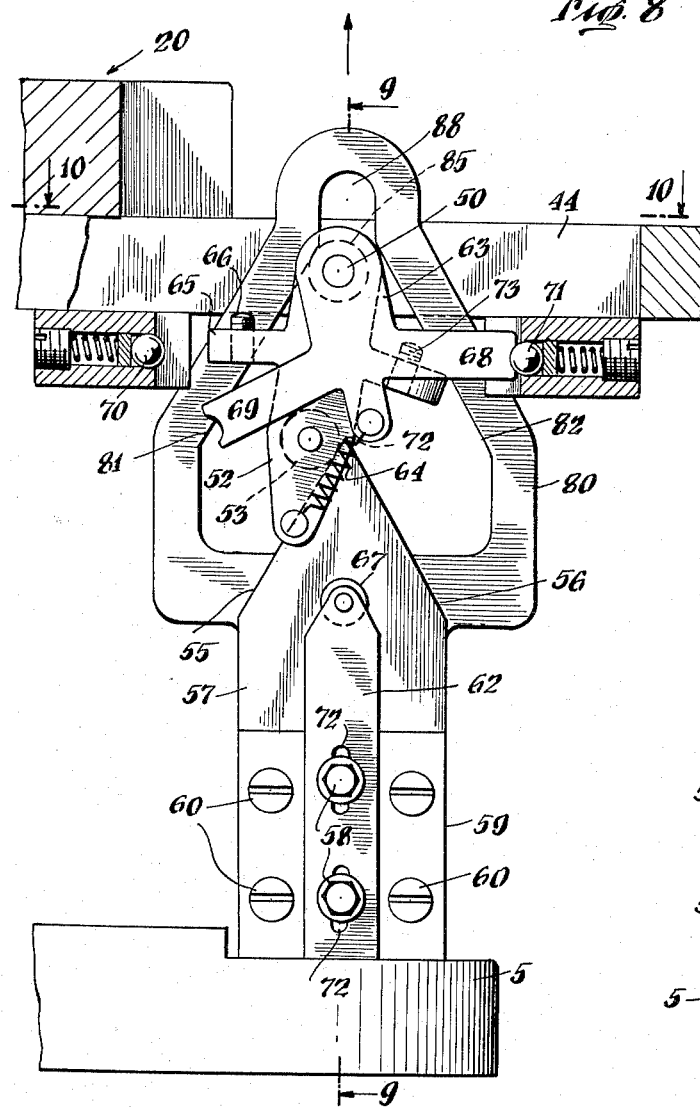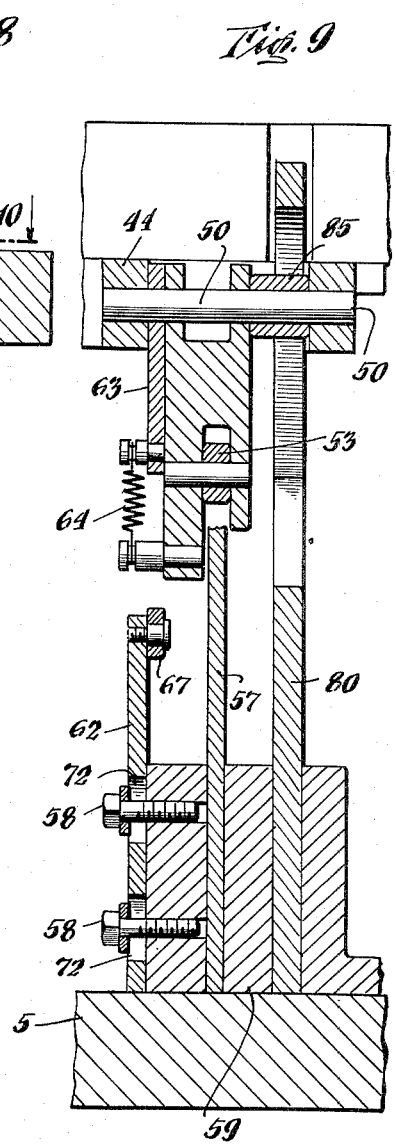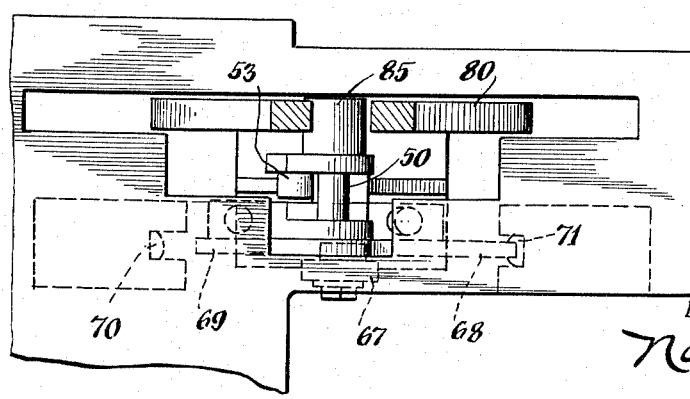

United States Patent Office

2,724,200
Patented Nov. 22, 1955

2,724,200

MACHINE FOR MAKING INLAID ARTICLES

James J. Larmour, Summit, N. J., assignor to Plastic Inlays, Inc., Summit, N. J., a corporation of New Jersey Application February 2, 1950, Serial No. 141,943

7 Claims. (Cl. 41—1)

The present invention relates to inlaying and more particularly to an improved machine and method adapted to be used for joining ornaments with articles molded from plastic materials.

The appearance of numerous articles is greatly enhanced by decorating them with ornamental inserts of contrasting materials and colors. While this is desirable the manufacturer is obliged to keep his costs at a minimum and yet to produce a thoroughly satisfactory article in order that he may compete economically with other manufacturers of similar goods. To do this it is desirable that the parts be quickly and firmly attached together by relatively simple and inexpensive machinery, and with minimum handling of parts. Minimum handling of parts greatly reduces production costs and also decreases the possibility of scratching or denting the decorative parts to be inlaid.

An object of the present invention is to provide a new and improved machine for inlaying ornaments in articles.

Another object of the invention is to provide a new and improved method of inlaying.

Another object is to provide a machine and method for inlaying ornaments in articles with a minimum of handling.

Another object is to provide a machine adapted to form metallic ornaments and to inlay them into articles without removing the ornaments from the machine prior to inlaying.

Another object is to provide an inlaying machine that requires very little skill on the part of an operator.

A further object is to provide an improved inlaying machine which is adapted to produce inlaid articles at relatively high rates of speed.

A still further object of the invention is to provide an improved inlaying machine which presents inlaid articles to full view of the machine operator immediately subsequent to inlaying, so that defective articles may be readily detected.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 1 is an enlarged fragmentary sectional view of an article inlaid by the present machine and method;

Fig. 2 is an elevational view showing a preferred form of the present invention;

Fig. 3 is a sectional view taken along line 3—3 of Fig. 2;

Fig. 4 is a sectional view taken along line 4—4 of Fig. 2;

Fig. 5 is an elevational view showing the machine of Fig. 2 with the parts in inlaying and ornamental blank forming relationship;

Fig. 6 is a sectional view taken along the line 6—6 of Fig. 5;

Fig. 7 is a sectional view taken along the line 7—7 of Fig. 5;

Fig. 8 is an enlarged elevational view, partly broken away, showing a preferred means for moving punches which form articles from a length of material;

Fig. 9 is a fragmentary sectional view taken along the line 9—9 of Fig. 8; and

Fig. 10 is a sectional view taken along line 10—10 of Fig. 8.

For convenience the present machine and method will be described with reference to inlaying a disc-like metal ornament 1 into an article 2 in the shape of a tuning knob for a television or radio set, the knob being molded from some synthetic resin material. It will be understood that the machine and method may be used for inlaying ornaments of other materials and shapes into various articles.

As shown, the present machine comprises generally a base 5 upon which is mounted a strip-supporting means 6, feeding means 7 adapted to feed a strip 34 to the support 6, a pair of reciprocable punches 8 and 9 carried by a slider 44 and movable alternately over the strip-supporting device 6 for punching ornamental blanks 1 from the strip, article holders 13 and 14 that may be alternately swung beneath the punches, and ejectors 15 and 16 for pressing ornamental blanks out of the punches 8 and 9 into articles carried by the article holders 13 and 14. Articles are placed into the holders 13 and 14 by hand and are similarly removed from them subsequent to inlaying.

The base 5 may rest upon and be secured by bolts 18 to a table 19 of any suitable and known type press, and a reciprocable head 20 that carries the punches may be secured in any suitable manner, for example through an extension 21, with a crosshead and crank of the press. The details of such presses are well understood in the art and not shown herein.

The present machine is so constructed and operated that when one of the punches (8 or 9) is cutting a blank from a strip of material 34 on the supporting means 6, the other punch is pressing a previously formed blank into an article carried by one of the article holders (13 or 14).

The machine and method will now be described in greater detail. As shown in Figs. 2 and 6 the strip-supporting means 6 is centrally located on the base 5 and comprises a bottom plate 23 threadedly engaged adjacent opposite ends thereof with vertically extending studs 24, each of the studs being surrounded by a spring 25 which urges the bottom plate 23 upwardly so that the enlarged heads on the bolts 24 press against portions of the base 5. A forming member or die 28, resting at its lower end against the base 5 and supported in upwardly extending position by blocks 29 is aligned with an opening 30 through the bottom plate 23. When the bottom plate 23 is supported at its highest position by the springs 25 the uppermost shaping end 31 of the forming member 28 is below the uppermost surface of the bottom plate.

A length of material 34 from which ornaments are to be cut one at a time by the punches 8 and 9 is moved intermittently over the upper surface of the plate member 23 and this feeding may be achieved by any suitable type of feeding device. One form of feeding device is shown at the right side of Fig. 6. As shown in Fig. 6 the strip of material 34 passes beneath inclined gripper members 35 and 42 which have their lowermost edges pressed against the upper surface of the strip by springs 36 supported on bolts 37. As the punch supporting head 20 moves downwardly along guide posts 10 of the press a cam 38 comes into contact with a roller 39 and moves the gripper member 42, through a rod 41, to the right by sliding it over the surface of the strip 34. The rear gripper member 35 holds the strip against rearward movement. As this sliding motion occurs the spring 40 is compressed and upon the next upward stroke of the head 20 the spring 40 urges the gripper member 42 and its supporting means to the left. The spring of the gripper member 42 causes the lower edge of the latter to grip the strip of material and move it forward an appropriate distance. The strip 34 moves a step forward each time the press makes an upward stroke, at which time the punches are clear of the strip supporting means 6. Any other suitable known type of intermittent feeding mechanism may be utilized in lieu of that disclosed herein.

Decorative blanks are cut from the strip 34 by the similar punches 8 and 9, the blank being suitably shaped where desirable by complementary surfaces (surface 31 on the forming member 28 and surfaces 33 on plungers 27 and 32) of the punches 8 and 9. As shown, the blanks are formed into a generally conical shape but they may be dome-shaped, flat, or of any other configuration. Only one of the punches cuts a blank from the strip 34 at a time, the punches being mounted upon a slider member 44 that is movable transversely with respect to the strip 34 to position them over the strip one at a time. When one of the punches is over the strip 34 it moves downwardly and cooperates with the aligned forming member 28 in forming an ornament from the strip. The blanks thus cut and formed from the strip are pushed upwardly into openings in the respective punches by the forming member 28. The plunger members 27 and 32 which form the upper surfaces of the blanks 1 are free to move up and down at the interior of the punches and hence may move upwardly as the blank is pressed up into the opening adjacent the lower part of either of the punches. The strip 34 is held downwardly against the plate member 23 by stripper members 45.

The relative diameters of the forming member 28 and the openings in the cooperating punches 8 and 9 are preferably such as to form a small edge or flange 3 on each of the blanks 1, this edge facilitating retention of the blank with an ornament, as will be further brought out hereinafter. As the blank is forced upwardly at the interior of a punch it is retained therein due to friction between its edge portions and adjacent wall portions of the punch, the frictional fit being sufficient to hold the plunger members 27 and 32 of the punches upwardly until they are forced down by the ejectors 15 or 16.

As previously mentioned, the hollow punches 8 and 9 are moved transversely of the strip and its supporting means 6 so that simultaneously with formation of an ornamental blank from the strip 34 by one punch, the other punch and its blank ejecting means may be inlaying a previously formed ornamental blank into an article. This movement of the punches transversely of the strip supporting means 6 is achieved by the slider moving device shown at the right side of Figs. 2, 3 and 5 and in greater detail in Figs. 8–10. As shown each of the punches is carried by the slider 44 and movement of the slider correspondingly moves the punches. The slider 44 is provided with projecting flanges 48 at opposite sides thereof which are supported on retaining and guiding shoes 49 bolted to the underside of the reciprocable head 20. The slider may move freely in a direction generally transversely of the strip 34 as it moves up and down with the head 20.

Rotatably mounted on the slider member 44 and within a slot thereof by a pin 50 is a slide actuating member 52 which carries a roller 53 adapted to travel selectively and alternately along one of the oppositely inclined surfaces 55 or 56 of an adjacent member 57 secured by screws 60 to a block 59 that is in turn secured to the base 5. When the roller 53 of the slide actuating member 52 is so disposed as to travel along the inclined surface 55, the slider 44 and punches are movable toward the left. When the roller 53 is disposed adjacent the oppositely inclined surface 56 the slider and punches are movable toward the right. The member 57 with its oppositely inclined guiding surfaces 55 and 56 is fixedly secured to the stationary base 5 and the alternate left and right movement of the slider member 44 occurs as the reciprocable head 20 moves on successive strokes toward the base 5; as the head 20 moves downwardly on one stroke the slider and its punches will be moved to the left and upon the next succeeding down stroke of the head 20 the slider will be moved to the right.

Rotation of the slide actuating member 52 about its mounting pin 50 so as to present the roller 53 to an appropriate inclined surface 55 or 56 is obtained by a stationarily mounted actuating member 62 through the intermediation of a "selector" member 63, rotatably mounted on the pin 50, and a spring 64 which connects the selector member with the slide actuating member 52.

For purposes of illustration let it be assumed (Fig. 2) that the head 20 is moving downwardly. As the roller 53 comes into contact with the left inclined surface 55, the arm 65 and its adjusting screw 66 are resting against the underside of the slider 44. The camming action of the surface 55 thus urges the slider and its punches to the left. When the roller 53 reaches the lower end of the incline 55 movement of the slider 44 to the left ceases and the punch 9 is aligned with the strip supporting device 6. During continued downward movement of the head 20 the roller travels along the vertical left edge 54 of the member 57 and the punch 9 cuts a blank from the strip 34. The other punch 8 is then adapted to cooperate with the holder 13 for inlaying a blank carried by the punch.

As the head 20 approaches a lower position from that shown in Fig. 2 the right arm 68 of the selector member 63 comes into contact with a roller 67 on the stationary member 62 and the arm 68 is forced upwardly or counterclockwise about the pivot 50 (note Fig. 5). The force or leverage applied by the roller 67 against the right arm 68 is sufficient to force the left arm 69 of the same selector member 63 out of engagement with the spring pressed ball 70 and to force the end of the right arm 68 into engagement with the spring pressed ball 71 adjacent the outer end of the right arm 68. Recesses may be provided in the outer ends of the arms 68 and 69 to receive the balls 70 or 71 and help hold the selector member in an adjusted position.

In disengaging the left arm 69 from its retaining ball 70 and simultaneously swinging the right arm 68, the spring 64 which connects the selector member 63 with a lower portion of the slide actuating member 52 is put under tension and tends to pull the lower end of the member 52 in counterclockwise direction. The member 52 is however at this time held against such counterclockwise movement as its roller 53 rests against a left edge of the stationary member 57.

As the head 20 moves upwardly from its lowermost position the slider 44 is moved toward the right and a central position 88 by a roller 85, mounted on the pin 50, which travels along an inclined surface 81 at the left side of a hollow cam member 80. The hollow cam member 80 is shown spaced rearwardly from the cam member 57 and is secured to the base 5.

As the slider approaches its central position 88 during upward movement of the head 20, the roller 53 of the slide actuating member 52 approaches the apex 72 of the stationary camming member 57 and when the head 20 has moved upwardly a sufficient distance the spring 64 snaps the roller over the apex 72 to the right side of the stationary member 57. The roller 53 is then disposed adjacent the oppositely inclined surface 56 so that upon downward movement of the head 20 on its next stroke the roller 53 travels along the right inclined surface 56 and along the vertical surface 59, in a manner similar to that described in connection with movement of the slider toward the left and along the left vertical surface 54. In this relationship the punch 8 may cut a blank from the centrally disposed strip 34 and the punch 9 will be disposed to cooperate with the other article holder 14. During this downward movement of the roller 53 along the right side of camming member 57, the left arm 69 of the selector member 63 contacts the roller 67 at the upper end of the stop member 62 and the selector member is swung clockwise about the pin 50 to the position shown in Fig. 2.

The roller 53 is thus alternately positioned adjacent one or the other of the inclined surfaces 55 or 56. As the head 20 thereafter moves upwardly the slide returning roller 85 travels along the right inclined surface 82 of the hollow cam member 80 and returns the slider 44 to the central position 88. When the head 20 has moved up far enough the roller 53 of the slide actuating member 52 will be snapped over the apex 72 of the stationary member by the spring 64 so that it is again adjacent the left inclined surface 55.

The member 62 which contacts the arms 68 and 69 of the selector member 63 may be adjusted up or down, by bolts 58 and slots 72, to actuate the selector member at the exact desired instant. The adjustable stops or set screws 66 and 73 may be suitably regulated to limit the extent of movement of the roller 53 with the slider actuating member 52.

While any suitable angles of inclination may be utilized for the surfaces 55 and 56 of the cam member 57 and for the surfaces 81 and 82 of the hollow cam member 80, angles of about 30° for each of them will give good results.

After a punch has formed an ornamental blank from the strip 34, the punch moves with the slider 44 so as to present the blank to an article for insertion therein. In Fig. 5 the punch 8 is shown disposed to inlay an ornamental blank and the punch 9 is disposed over the strip 34 and forming a blank therefrom. As the slider and punch 8 move to the left both the slider and punch 8 move downwardly toward the base 5. Prior to reaching their lowermost position the article holder 13 (Fig. 4) is rotating into position beneath the punch 8 so that an article 13 on the holder may receive the blank carried by the punch 8.

The article holders 13 and 14 are rotated about pins 89 and 90, in response to reciprocation of the head 20 and lateral movement of the slider 44, by rods 91 and 92 that are carried adjacent their upper ends by the slider 44 and project downwardly into slots 93 and 94 formed in extensions of the article holders. The lower portions of the rods 91 and 92 preferably extend into the respective slots 93 and 94 at all times.

As the head 20 moves downwardly upon one stroke the slider 44 is moved to the left and its holder-actuating pin 91 travels along the holder slot 93 and swings the holder 13 about its pin 89 so as to align it with the punch 8 when the latter has reached its farthest left position. To insure accurate alignment of the holder 13 and the punch 8 a pilot rod 100 moves into an aperture 101 in a projecting ear 102 carried by the member which carries the holder 13.

When the slider 44 is moved toward the right, upon a succeeding down stroke of the head 20, the holder 14 is similarly aligned with the punch 9, a second pilot pin 104 cooperating with an aperture 105 of ear 106 to insure proper alignment with the punch 9.

When either of the punches and its respective holder are in alignment with each other the previously formed ornamental blanks carried within the punches are inserted into the articles. To achieve this the blanks are ejected from the holders and forced into the underlying article.

Ejection of a blank is obtained by an appropriate of the ejector members 15 or 16, the ejector member 15 serving to move blanks out of the punch 8 into the articles held by the holder 13 and the ejector 16 serving to move blanks out of the holder 9 and into articles held by the holder 14.

The ejectors 15 and 16 are contained in recesses of the head 20 and are rotatable about pins 107 and 108, respectively; they move up and down with the head 20 but do not move transversely with the slider member 44. The slider member 44 is provided with an opening around the upper end of each of the punches so that the upper ends of the plungers 27 and 32 in the punches may be contacted by an appropriate ejector when moved into alignment therewith.

In Fig. 7 the left ejector 15 is shown pressing the plunger 27 of the punch 8 downwardly so as to press the ornamental blank 1 into the article 2 held by the holder 13. The ejectors 15 and 16 are swung about their pins by posts 110 and 111 secured to the base 5 and located adjacent opposite ends of the ejector members. When the slider 44 is in its left position the ejector 15 is aligned with the punch 8 and with the holder 13, and may operate them by movement into the opening 95. When the slider 44 is at its extreme right position the other ejector 16 may move into the aligned opening 96, so as to move the plunger 32 of the punch 9 and press a blank into an article held by the holder 14.

As the plungers 27 or 32 are moved out of their respective hollow punches the blanks 1 are forced out of the hollow punches and pressed against articles 2 so that the flanges 3 on the blanks preferably dig into the article; this assists in retaining the blanks with the articles.

When the machine is in operation the head 20 preferably reciprocates continuously, the press drive shaft and drive motor being controlled through any suitably and known type of foot pedal and linkages. The slider 44 moves transversely of the strip-supporting means 6 and a strip moving therethrough. Ornaments are cut or blanked from the strip 34 upon each down stroke of the machine and a blank is inlaid into an article at each down stroke of the machine. This is achieved by the pair of punches 8 and 9, one of which forms a blank and the other of which simultaneously cooperates with a holder to insert the blank into an article. The article holders 13 and 14 rotate about their mountings so as to alternately move an article into position beneath a punch for inlaying and to move an article out of inlaying position and toward the front of the machine where it may be readily removed by the operator. An operator may quickly and easily remove an inlaid article and place a fresh article to be inlaid into an outwardly disposed article holder. During removal of an article from a holder the operator may inspect it to be sure that it is not defective.

It will be seen that the present invention provides a new and improved machine and method adapted to quickly and firmly inlay ornaments into articles. Operation of the machine may be continuous and the ornaments to be inlaid are held in the machine from the time of their formation until they are assembled with an article and discharged with the article from the machine; it is not necessary that the ornaments be handled intermediate their formation and their insertion into articles. Articles to be inlaid may be readily placed into the holders when they are in an outward readily available position and the inlaid articles may be easily removed from the holders and inspected by the operator. The machine and method are rapid in operation and capable of turning out large quantities of inlaid articles in a minimum amount of time. The machine is of relatively simple and fool-proof construction and is well adapted to withstand any rough usage to which it may be subjected.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In a device of the class described, the combination of means adapted to support a length of material, a member above said support means reciprocable toward and away therefrom and movable generally transversely thereof, a plurality of blank forming means carried by said member, means for moving said member generally transversely of said support means to place at least one of said blank forming means in registry with the support means for each reciprocation of the member toward the support means, a plurality of holders for articles to be inlaid, means for moving said article holders into alignment one at a time with a blank forming means that is out of registry with said support means, and means adapted to transfer blanks from said blank forming means to articles held by said article holders during each reciprocation of the member toward the support means.

2. In a device of the class described, the combination of means adapted to support a length of material, a member above said support means reciprocable toward and away therefrom and movable generally transversely thereof, a plurality of blank forming means carried by said member, a forming die adjacent said support means, means for moving said member generally transversely of said support means to place at least one of said blank forming means in registry with the support means and forming die for each reciprocation of the member toward the support means, said blank forming means cooperating with said die to form and shape a blank, a plurality of holders for articles to be inlaid having a surface shaped to correspond to the shape of said blank, means for moving said article holders into alignment one at a time with a blank forming means that is out of registry with said support means so that said shaped blank is aligned with the shaped surface of said article, and means adapted to transfer blanks from said blank forming means to articles held by said article holders during each reciprocation of the member toward the support means.

3. The device as claimed in claim 2 in which said die has an upper convex surface and in which said blank forming means has a corresponding concave surface whereby an article held by said holder and having a rounded surface may be inlaid.

4. In a device of the class described, the combination of means adapted to support a length of material, a member above said support means reciprocable toward and away therefrom and movable generally transversely thereof, a plurality of punch means carried by said member, means for moving said member generally transversely of said support means to place at least one of said punch means in registry with the support means for each reciprocation of the member toward the support means, a plurality of holders for articles to be inlaid, means for moving said article holders into alignment one at a time with a punch means that is out of registry with said support means, a plunger reciprocally mounted in each of said punch means so that it slides upwardly as the punch means punches said material, an ejector means mounted on said transversely movable member adjacent each punch means, and a fixed post adjacent each article holder to rotate said ejector means when a punch means is moved toward an article holder to eject a blank from the punch means.

5. In a device of the class described, the combination of means adapted to support a length of material, a member above said support means reciprocable toward and away therefrom and movable generally transversely thereof, a plurality of blank forming means carried by said member, means for moving said member generally transversely of said support means to place at least one of said blank forming means in registry with the support means for each reciprocation of the member toward the support means, a plurality of pivoted holders for articles to be inlaid, means operatively connecting said member to each of said holders for swinging said holders into alignment one at a time with a blank forming means that is out of registry with said support means, and ejector means adapted to transfer blanks from said blank forming means to articles held by said article holders during each reciprocation of the member toward the support means.

6. In a device of the class described, the combination of a base, means adapted to support a length of material mounted on said base, a member above said support means reciprocable toward and away therefrom and movable generally transversely thereof, a plurality of punch means carried by said member, means for moving said member generally transversely of said support means to place at least one of said punch means in registry with the support means for each reciprocation of the member toward the support means, a plurality of holders for articles to be inlaid pivotally mounted on said base, rod members operatively connecting said member and each of said holders for moving said article holders between a loading position and a position in alignment with a punch means that is out of registry with said support means, and ejector means above said transversely movable member adapted to transfer punched out pieces of material from said punch means to articles held by said article holders.

7. In a device of the class described, the combination of means adapted to support a length of material, a member above said support means reciprocable toward and away therefrom and movable generally transversely thereof, a pair of blank forming means carried by said member, means for moving said member generally transversely of said support means to place one of said blank forming means in registry with the support means for each reciprocation of the member toward the support means, a pair of holders for articles to be inlaid, means for moving said holders into alignment one at a time with the blank forming means that is out of registry with said support means, and means adapted to transfer blanks from the blank forming means in alignment with the holder to articles held by said holders during reciprocation of the member toward the support means.

References Cited in the file of this patent

UNITED STATES PATENTS

| Number | Name | Date |
| --- | --- | --- |
| 211,600 | Snediker | Jan. 21, 1879 |
| 557,821 | Hull | Apr. 7, 1896 |
| 1,352,194 | Hooker | Sept. 7, 1920 |
| 1,661,417 | Evans et al. | Mar. 6, 1928 |
| 1,914,514 | Lapham | June 20, 1933 |
| 2,041,530 | De Witt et al. | May 19, 1936 |
| 2,237,152 | Larmour | Apr. 1, 1941 |
| 2,315,769 | Carney | Apr. 6, 1943 |
| 2,318,977 | Sypher | May 11, 1943 |
| 2,347,585 | Wainman | Apr. 25, 1944 |
| 2,398,482 | Wainman | Apr. 16, 1946 |
| 2,461,034 | Castle | Feb. 8, 1949 |
| 2,484,874 | Brown | Oct. 18, 1949 |